(12) United States Patent
Snider

(10) Patent No.: US 10,479,659 B2
(45) Date of Patent: Nov. 19, 2019

(54) MECHANISM TO SELECTIVELY FIX OR FREE PLANETARY CARRIER OF EPICYCLIC GEARBOX

(71) Applicant: INGERSOLL-RAND COMPANY, Davidson, NC (US)

(72) Inventor: Stephen David Louis Snider, Kent, WA (US)

(73) Assignee: Ingersoll-Rand Company, Davidson, NC (US)

(*) Notice: Subject to any disclaimer, the term of this patent is extended or adjusted under 35 U.S.C. 154(b) by 447 days.

(21) Appl. No.: 15/333,032

(22) Filed: Oct. 24, 2016

(65) Prior Publication Data

US 2018/0111807 A1 Apr. 26, 2018

(51) Int. Cl.
 *B66D 1/22* (2006.01)
 *B66D 5/00* (2006.01)
 *F16H 3/72* (2006.01)
(52) U.S. Cl.
 CPC .............. *B66D 1/225* (2013.01); *B66D 5/00* (2013.01); *F16H 3/728* (2013.01); *F16H 2200/2005* (2013.01); *F16H 2200/2033* (2013.01)
(58) Field of Classification Search
 None
 See application file for complete search history.

(56) References Cited

U.S. PATENT DOCUMENTS

| | | | |
|---|---|---|---|
| 2,052,815 A * | 9/1936 | Wilsing | F16H 3/64 475/279 |
| 2,426,593 A | 9/1947 | Buckendale | |
| 5,062,613 A | 11/1991 | Petrachkoff | |
| 5,286,238 A | 2/1994 | Shimizu et al. | |
| 5,842,684 A | 12/1998 | Aho | |
| 6,916,267 B2 | 7/2005 | Jones et al. | |
| 7,703,751 B2 | 4/2010 | Elliot et al. | |
| 7,891,641 B1 | 2/2011 | Miller | |
| 7,909,308 B2 | 3/2011 | Lauder et al. | |
| 7,922,153 B2 | 4/2011 | Zhou et al. | |
| 2010/0127228 A1 | 5/2010 | Xie et al. | |
| 2010/0127229 A1 | 5/2010 | Kyerneland et al. | |
| 2012/0302387 A1 | 11/2012 | Scekic et al. | |
| 2015/0284230 A1 | 10/2015 | Hall et al. | |
| 2016/0003351 A1 * | 1/2016 | Park | F16H 3/54 475/153 |

FOREIGN PATENT DOCUMENTS

GB 863307 3/1961

OTHER PUBLICATIONS

International Search Report and Written Opinion dated Jan. 31, 2018 from International Patent Application No. PCT/US2017/058120 filed Oct. 24, 2017.

* cited by examiner

*Primary Examiner* — Colby M Hansen
(74) *Attorney, Agent, or Firm* — Jones IP Group; Wayne A. Jones

(57) ABSTRACT

The present invention provides methods and mechanisms to selectively fix or free a planetary carrier of a epicyclic gearbox, thereby allowing dual modal operation of the gearbox and facilitating selective operation of a device, such as a winch, having capacity to safely and efficiently operate in a high load heavy lifting utility mode and a low load light lifting personnel mode.

20 Claims, 7 Drawing Sheets

MECHANISM TO SELECTIVELY FIX OR FREE PLANETARY CARRIER OF EPICYCLIC GEARBOX

CROSS REFERENCE TO RELATED APPLICATIONS

This application is filed concurrently on Oct. 24, 2016 with U.S. patent application Ser. No. 15/333,002 to Stephen Snider, entitled "DUAL CAPACITY WINCH USING TWO MOTORS AND A SINGLE GEARBOX AND DRUM," the disclosure of which is hereby incorporated entirely herein by reference.

BACKGROUND

Technical Field

The following relates generally to winches, and more generally relates to a duel capacity winch using two motors and a locking mechanism to selectively fix or free a planetary carrier of an epicyclic gearbox, to selectively drive different stages of the epicyclic gearbox.

State of the Art

Winches are well known in the art. A winch is a mechanical device that is used to haul in (spool) or pay out (unspool) or otherwise adjust the tension of a rope, wire, or cable that is wound upon the drum or spool of the winch. Typically, a winch is powered by an electric, hydraulic or pneumatic motor, or an internal combustion engine to turn a driving mechanism, and often includes gears assembled to alter the relation between the speed of the driving mechanism and the speed of the driven part(s), such as the drum, as well as to increase or reduce the device's output torque. Ordinary winches may include one or more solenoid brakes and/or mechanical brakes to engage the drum, or a ratchet and pawl device to help prevent unwanted turning of the drum and unwinding of the cable.

It is sometimes desirable to be able to lift heavy loads, such as heavy equipment and supplies often weighing between 1000 kg-10000 kg, and also be able to lift relatively light loads, such as human personnel weighing less than 1000 kg. Currently, there are limited options for those desiring to use a winch to lift vastly different loads: they can install two winches, one for utility lifting of heavy loads and one as a dedicated personnel winch; they can install a single dual-rated winch with a personnel rating that requires the person to be enclosed in a cage/carriage, and often including a brake or brakes necessarily sized to prevent heavy load movement; or they can use a utility winch with no other type of de-rating, potentially harming the personnel on the end of the wire rope, and also often including a brake or brakes necessarily sized to prevent heavy load movement. Hence, there is a need for a true dual capacity winch having a mechanism that permits the winch to handle utility loads of several thousand pounds, while also having functional capability to safely and efficiently handle lighter load capacities of a few hundred pounds, thereby eliminating the need for a second dedicated light load winch, facilitating the inclusion of a brake or brakes sized for light load operation, and ensuring the safety of personnel being lifted by the winch, even without the utilization of an additional cage/carriage.

SUMMARY

An aspect of the present disclosure includes method for selectively fixing or freeing a planetary carrier of an epicyclic gearbox of a dual capacity winch, the method comprising: providing a dual capacity winch having a single epicyclic gearbox coupled to a drum of the winch, wherein the drum of the winch is supported by at least one stationary winch upright; providing a first motor configured to drive a sun gear of the epicyclic gearbox so that the operation of the gear box, when the sun gear is driven, results in substantial torque multiplication; providing a second motor configured to drive a planetary carrier of the epicyclic gearbox, so that the resulting gear ratio is significantly lower than when the sun gear is driven; providing a brake to selectively prevent movement of the sun gear; and providing a locking mechanism configured to engage and drive the planetary carrier of the epicyclic gearbox, wherein the locking mechanism includes a movable portion configured to selectively lock with the at least one stationary winch upright, when the sun gear is driven, and to selectively disengage and unlock from the at least one stationary winch upright, when the planetary carrier of the epicyclic gearbox is driven.

Another aspect of the present disclosure includes a method of selectively driving different stages of an epicyclic gearbox of a dual capacity winch having high load and low load operation modes, the method comprising: selecting a high load operation mode of a dual capacity winch and utilizing a first motor to drive a gear of an epicyclic gearbox to turn a drum of the winch, wherein a locking mechanism is coupled to a planetary carrier of the epicyclic gearbox and is selectively engaged with a winch upright of the winch, thereby preventing rotational movement of the planetary carrier, when the high load operation mode is selected; selecting a low load operation mode of the dual capacity winch and utilizing a second motor to drive the planetary carrier of the epicyclic gearbox to turn the drum of the winch with a much lower gear ratio than the high load operation, wherein the locking mechanism remains coupled to the planetary carrier but is selectively disengaged from the winch upright, thereby permitting rotational movement of the planetary carrier, when the low load operation mode is selected; and preventing rotational movement of the gear, when the low load operation mode is selected.

Still another aspect of the present disclosure locking mechanism to selectively fix or free a planetary carrier of an epicyclic gearbox, to selectively drive different stages of the epicyclic gearbox, the mechanism comprising: a shaft, configured to be driven by a first motor, wherein the shaft is coupled to a planetary carrier of an epicyclic gearbox, the shaft having engagement features; a locking component, having shaft engagement features configured to movably engage the engagement features of the shaft; and an actuator, the actuator configured to move the locking component between: a first position, wherein the shaft locking features of the locking component are in physical engagement with the locking features of the shaft, so that the shaft is not free to spin and be driven by the first motor, but a gear of the epicyclic gearbox is free to be driven by a second motor; and a second position, wherein the shaft engagement features of the locking component are disengaged from the engagement features of the shaft, so that the shaft is free to spin and be driven by the first motor.

The foregoing and other features, advantages, and construction of the present disclosure will be more readily apparent and fully appreciated from the following more detailed description of the particular embodiments, taken in conjunction with the accompanying drawings.

BRIEF DESCRIPTION OF THE DRAWINGS

Some of the embodiments will be described in detail, with reference to the following figures, wherein like designations denote like members.

DETAILED DESCRIPTION OF EMBODIMENTS

Figure 1:
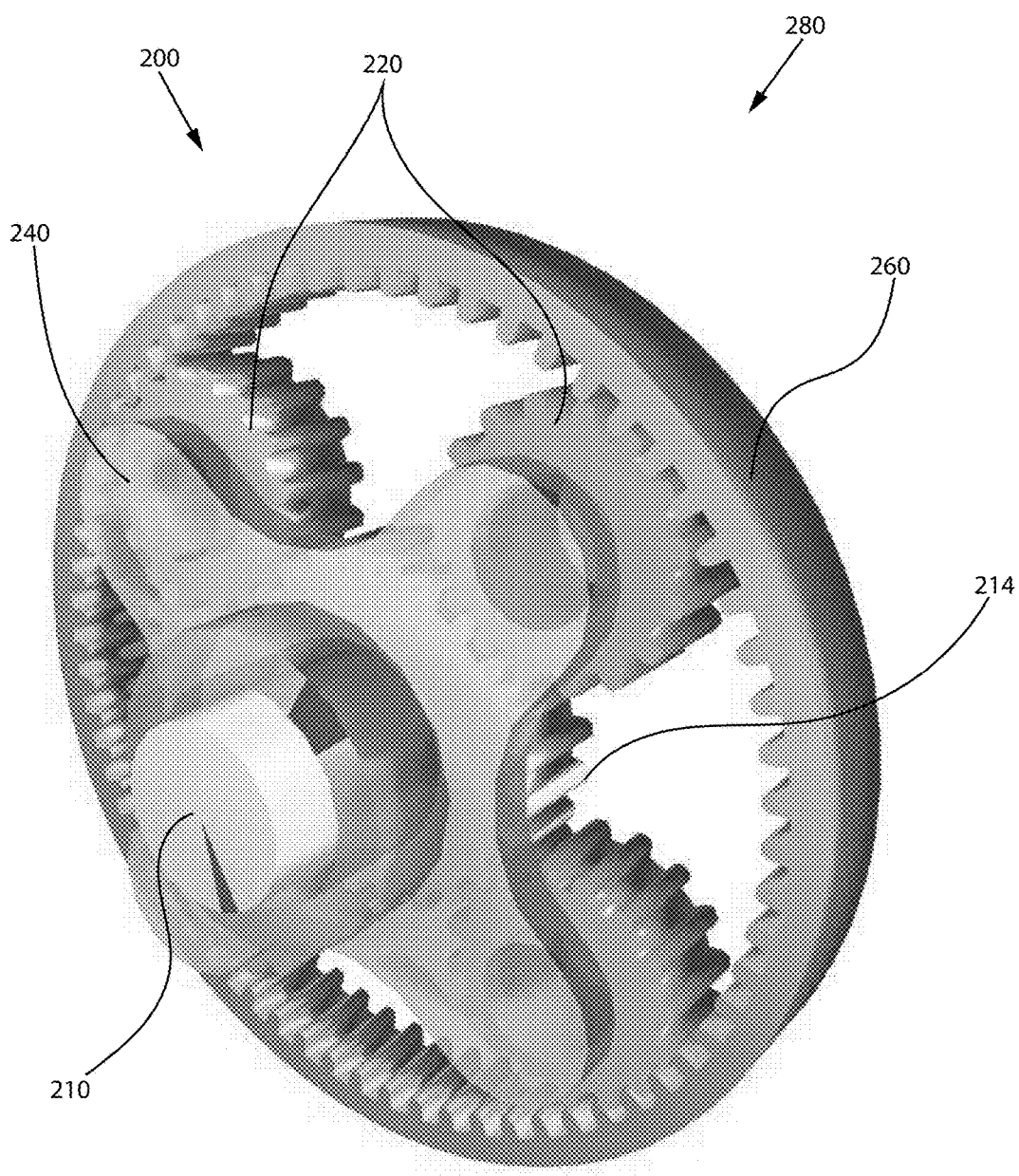
FIG. 1 is a perspective view of an embodiment of a common epicyclic gear train, as is known in the prior art.

A detailed description of the hereinafter described embodiments of the disclosed apparatus and method are presented herein by way of exemplification and not limitation with reference to the Figures listed above. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

The drawings depict illustrative embodiments of a dual capacity winch 300. These embodiments may each comprise various structural and functional components that complement one another to provide the unique functionality and performance of the dual capacity winch 300, the particular structure and function of which will be described in greater detail herein. For example, the duel capacity winch 300 may use two motors 390a and 390b and an embodiment of a locking mechanism 100 to selectively fix or free a planetary carrier 240 of an epicyclic gear assembly or gearbox 312, to selectively drive different stages 201, 202, and 203, of the epicyclic gear assembly or gear box 312 of the dual capacity winch 300, among other various components to be described herein.

Referring now specifically to the drawings, an example of a prior art epicyclic gear train 200, is illustrated and shown generally in FIG. 1. An epicyclic gear train 200 consists of at least two gears mounted so that the center of one gear revolves around the center of the other. A carrier, such as planetary carrier 240, connects the centers of the two gears and may rotate to carry at least one gear, often called the planet gear 220, around the other, often called the sun gear 214. The sun gear is often coupled to a drive shaft 210. The planet gear 220 and sun gear 214 ordinarily mesh so that their pitch circles roll without slip. As depicted, the sun gear 214 is fixed and the planetary gear(s) 220 roll around the sun gear 214. However, those of ordinary skill in the art appreciate that other components, such as the planetary carrier 240, can be fixed. An epicyclic gear train 200 can be assembled so the at least one planet gear 220 rolls on the inside of the pitch circle of an outer gear ring, gear casing, or ring gear 260, sometimes called an annular gear. The combination of epicyclic gear trains 200 with at least one planet gear 220 engaging both a sun gear 214 and a ring gear 260 is commonly called a planetary gear train 280. Oftentimes, the ring gear 260 is fixed and the sun gear 214 is driven. Those of ordinary skill in the art appreciate that a plurality of epicyclic gear trains 200 may be assembled together to form a combined gear assembly having multiple stages, wherein each stage corresponds to a particular epicyclic gear train.

Figure 2:
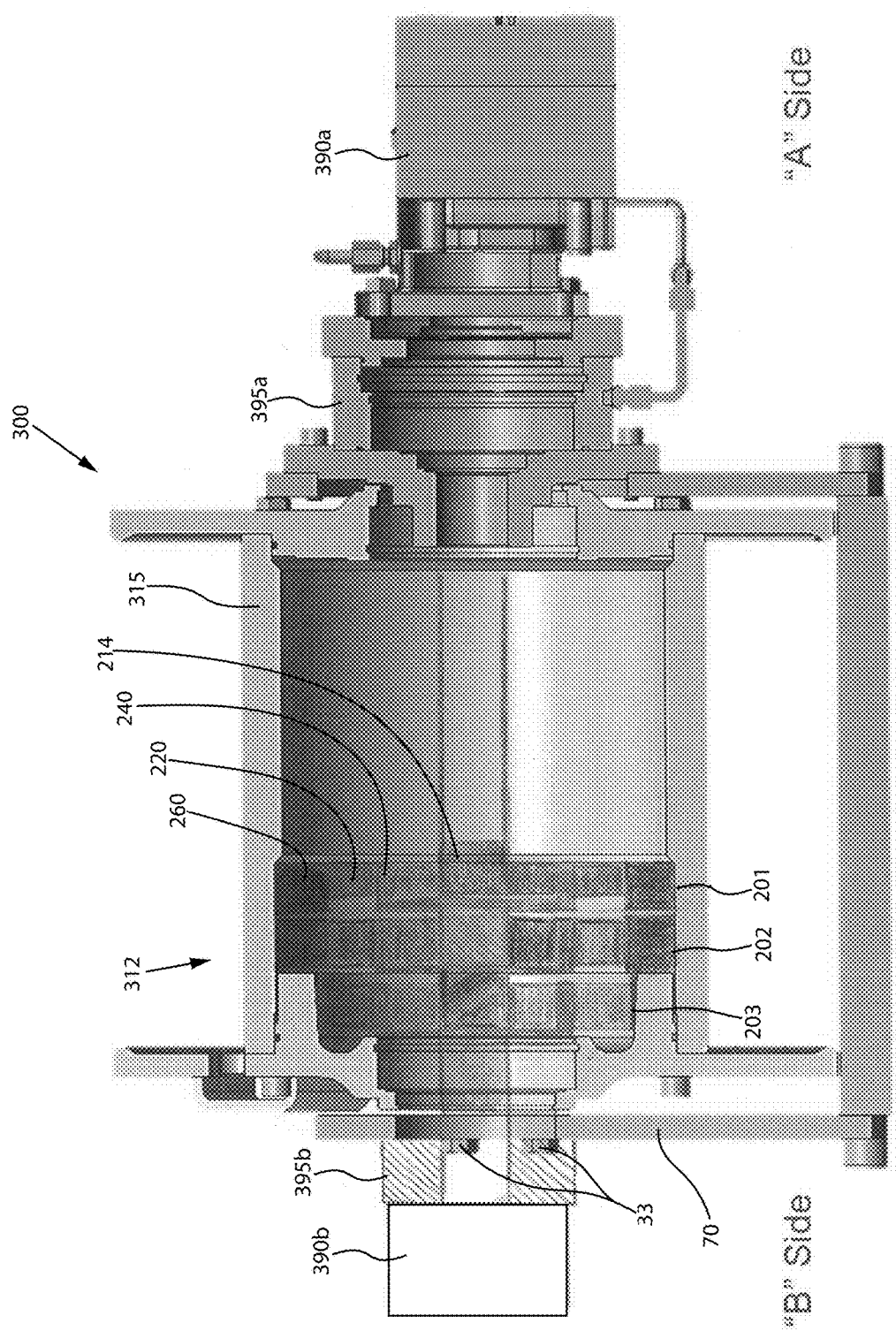
FIG. 2 is a side cut-away view of an embodiment of a dual capacity winch.

Referring further to the drawings, a side cut-away view of an embodiment of a dual capacity winch 300 is depicted in FIG. 2. The winch 300 includes a spool or drum 315 serving as a housing for an epicyclic gear assembly or gearbox 312. As depicted, the gearbox 312 may include three stages 201, 202, and 203, wherein each stage may correspond to a particular epicyclic gear train having an axially central sun gear 214 orbited by planetary gears 220 operable with a planetary carrier 240. The epicyclic gear train may function with an outer-most ring gear 260 that may be coupled to the drum 315 and serve as a drive member. The ring gear 260 may also be an integral portion of the drum 315, such as internal toothed casing portion. The dual capacity winch 300 has two motors 390a and 390b to selectively drive different components of the winch 300 depending on different desired functionality. Primary sides A and B of the winch 300 are located at opposite ends of a central axis of the drum 315. The winch 300 may also include two brakes 395a and 395b. The drum 315 of the winch 300 may be supported by winch uprights 70, and pin bolts 33 may be utilized to fasten portions of the epicyclic gear assembly or gear box 312.

Figure 3:
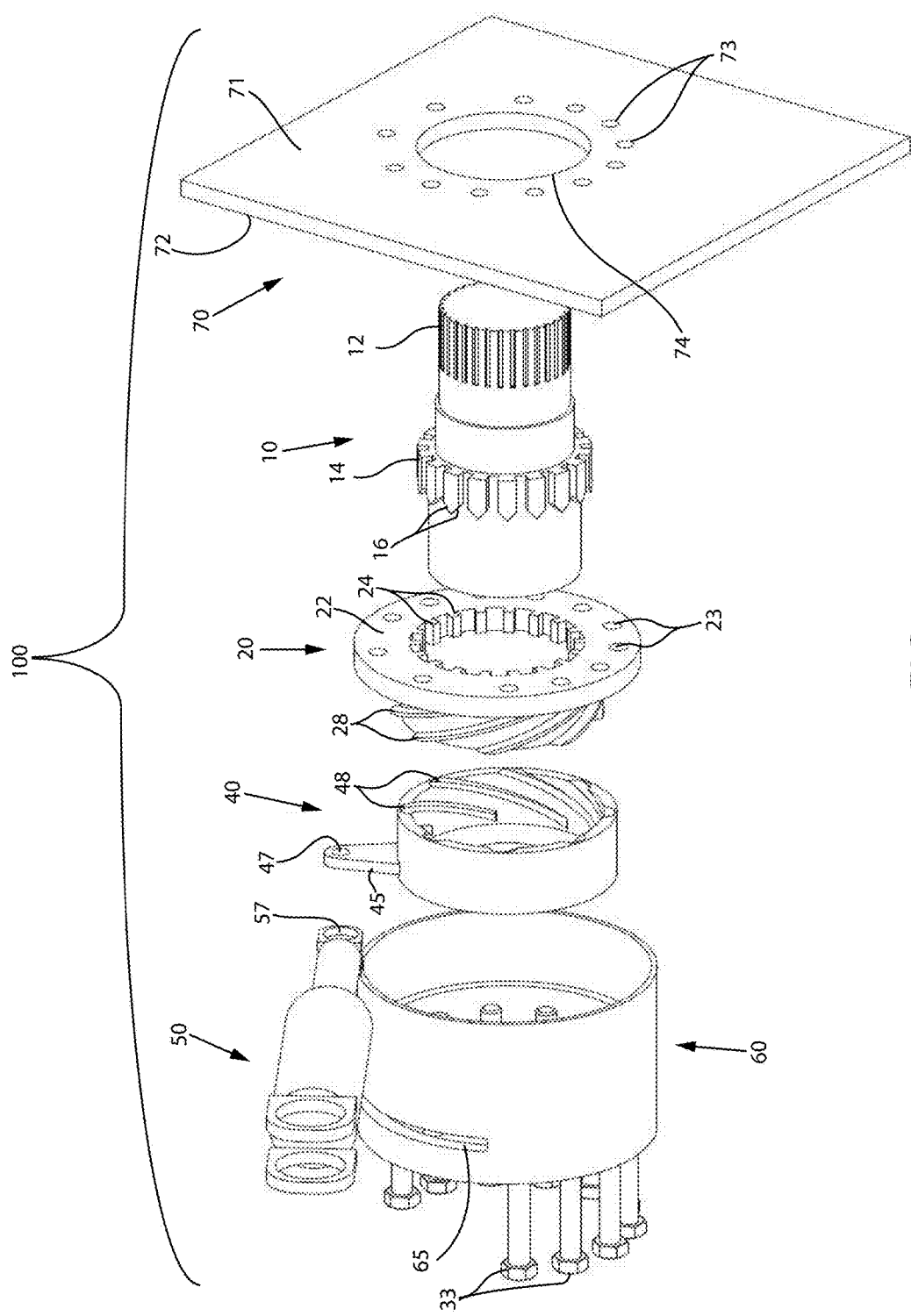
FIG. 3 is an exploded perspective view of one embodiment of a mechanism for selectively fixing or freeing a planetary carrier of an epicyclic gearbox of a dual capacity winch.

A dual capacity winch 300 may include a locking mechanism 100, as depicted, inter alia in FIG. 3. The locking mechanism 100 may be provided and configured to permit operable selection of either a high load/heavy weight mode, or a low load/light weight mode of the winch 300, wherein the dual modes may be facilitated by the operation of the single gearbox 312. The locking mechanism 100 may negate the need for a brake 395b. The selection of a lifting mode, such as a high load or heavy lifting mode or a low load or light lifting mode, may engage or disengage the locking mechanism 100 and automatically lock or unlock the winch 300 into a proper configuration for operation in that selected mode. For instance, for a high load mode, the (last stage) planetary carrier 240 of the epicyclic gear train associated with stage 203 may be held fast, and the gearbox 312 input may be the (first stage) sun gear 214 associated with the epicyclic gear train 201. In such a selected high load mode, the winch 300 may be used to lift its highest rated load, such as for lifting between 1000 kg-10000 kg.

The dual functionality of the dual capacity winch 300 may be facilitated, in part, by operation of the locking mechanism 100. For example, when a user selects low mode/light weight functionality, the locking mechanism may shift so that the first stage 201 sun gear 214 may be held fast and the last stage 203 planetary carrier 240 may be the input member. In such a selected low load mode, the winch 300 may be limited to a lower rated load, such as for carrying less than 1000 kg of personnel.

An embodiment of a locking mechanism 100, as depicted in perspective view and exploded form in FIG. 3, may be comprised of various components, such as a shaft 10, a threaded lock plate 20, a threaded coupler 40, a linear actuator 50, and a mechanism housing 60. At the center of the locking mechanism 100 is a shaft 10 that connects to a splined planetary carrier 240 within the gear assembly or gearbox 312. This shaft 10 may be driven by a motor 390b. The shaft 10 has a spline 12 at the end of the shaft to connect to the planetary carrier 240 of the third stage 203 of the gearbox 312 of the dual capacity winch 300. The shaft 10 also has an engagement spline 14 that is located part way along the length of the shaft 10 that connects with a threaded lock plate 20. The engagement spline 14 may be cut, or otherwise formed, with tapered edges 16 to help facilitate smooth engagement and/or disengagement with complimentary features, such as internal splines 24, of the threaded lock plate 20. The threaded lock plate 20 may be prevented from rotating, inter alia, by pin bolts 33 that may be configured to pass through openings 23 of the threaded lock plate 20 and, ultimately, be threaded into corresponding seats 73 of the winch upright 70. The pin bolts 33 may, therefore, run through the entire locking mechanism 100, so, whether the threaded lock plate 20 is raised or lowered (extended or retracted), it will not rotate, but will be confined to only to linear axial movement. The threaded lock plate 20 may be mated to a threaded coupler 40, such that a rotation of the threaded coupler 40 will move the threaded lock plate 20 linearly along an axis of the splined shaft 10, towards or away from a winch upright 70. The threaded lock plate 20 may have face or side 22 that may face the winch upright 20. The winch upright 70 may include an opening 74, wherein the opening 74 may be coaxially centered with the axis of the shaft 10 and/or locking mechanism 100 generally, and the opening 74 may be sized to permit at least a portion of the shaft 10 to extend therethrough, for engagement with the planetary carrier 240 of stage 203 of gear assembly or gearbox 312 of the winch 300. The winch upright 70 may be fairly planar in dimension and may include a gearbox side 71 and a locking mechanism side 72.

The locking mechanism 100 may be configured so that the threaded lock plate 20 may be moved axially into engagement with the shaft 10 or out of engagement with the shaft 10, to either lock the shaft 10 or respectively permit the shaft 10 to spin freely, when the shaft 10 is not engaged with the threaded lock plate 20. The threaded coupler 40 may be moved by using a linear actuator 50 (e.g. hydraulic cylinder, pneumatic cylinder, piezoelectric, or electro-mechanical linear actuator). The linear actuator 50 may be connected to a drive component 45 of the threaded coupler 40, such as with a hinge pin between a pivot opening 47 of the drive component 45 of the threaded coupler and a corresponding opening 57 of the linear actuator. The threaded coupler 40 may include internally protruding threads 48 configured to complimentarily engage externally protruding threads 28 of the threaded lock plate 20. The interaction of the threads 48 of the threaded coupler 40 with the threads 28 of the threaded lock plate 20 may act as a screw mechanism that converts rotational motion to linear motion, and a torque (rotational force) to a linear force, so as to permit axial travel of the threaded lock plate 20 with respect to the threaded coupler 40. The threaded coupler 40 may be prevented from moving axially, inter alia, by a register on the splined shaft 10 and by the mechanism housing 60. The mechanism housing 60 may provide structural support to the entire locking mechanism 100, and may also protect the threaded coupler 40 and threaded lock plate 20 from damage. The housing may include an opening 65 sized to allow the drive component 45 of the threaded coupler 40 to extend therethrough, and may be configured to allow the drive component 45 to rotate axially as it is driven or otherwise moved by the linear actuator 50.

With continued reference to FIGS. 1-3, the locking mechanism 100 is further described as being operable with a control system, in such a way that only two distinct operating modes are available. In general, the control system, or control, may comprise a device, or set of devices, that manage command, direct, or regulate the behavior or operation of other devices and/or systems associated with and/or including the winch 300. Specific details related to embodiments of one or more component parts of the control may be found in Applicant's co-pending U.S. patent application Ser. No. 15/333,002 to Stephen Snider, entitled "DUAL CAPACITY WINCH USING TWO MOTORS AND A SINGLE GEARBOX AND DRUM," the disclosure of which is hereby incorporated entirely herein by reference. For example, the control may comprise, or otherwise operate with, the linear actuator 50, of the locking mechanism 100. The linear actuator 50 may be connected to the control in such a way that the linear actuator 50 acts in some ways like a switch or a lever to activate operations of the winch 300. The linear actuator 50 may manually and/or automatically extend or retract based on the lifting mode selected. In high load or heavy lifting mode, the linear actuator 50 may be placed in a first position associated with a configuration that allows one motor 390a to drive the first stage 201 sun gear 214 resulting in maximum torque multiplication, and the efficient ability to lift heavy loads. In low load or light lifting mode, the linear actuator may be placed a second position associated with a configuration that allows a second motor 390b to be used to drive the last stage 203 planetary carrier 240 resulting in minimum torque multiplications and the efficient ability to lift lighter loads. Each mode may automatically lock out the other in such a way that it is not possible to have both motors 390a/390b acting on the gear assembly ore gearbox 312 at the same time. The linear actuator 50 may have, or operate with, an internal spring, or other force applying device, to hold the linear actuator 50 in specific position, such as a fully extended first position, in the absence of a control signal. When a user selects a utility high load or heaving lifting mode, the linear actuator 50 may be fully extended, so that the threaded coupler 40 will act upon the locking plate 20 allowing the locking plate 20 to move axially into its fully lowered state, thereby engaging the external splines 14 of the shaft 10 with the internal splines 24 of the locking plate 20 and, by so doing, affixing the orientation of the splined shaft 10 to the stationary winch upright 70. Moreover, when the user selects light load mode, power applied to the linear actuator 50 (e.g. electrical signal, air pressure, hydraulic pressure) will cause it to retract, rotating the threaded coupler 40 and raising the lock plate 20, thereby disengaging the lock plate 20 from the splined shaft 10 and allowing the splined shaft 20 to rotate freely.

Figure 4:
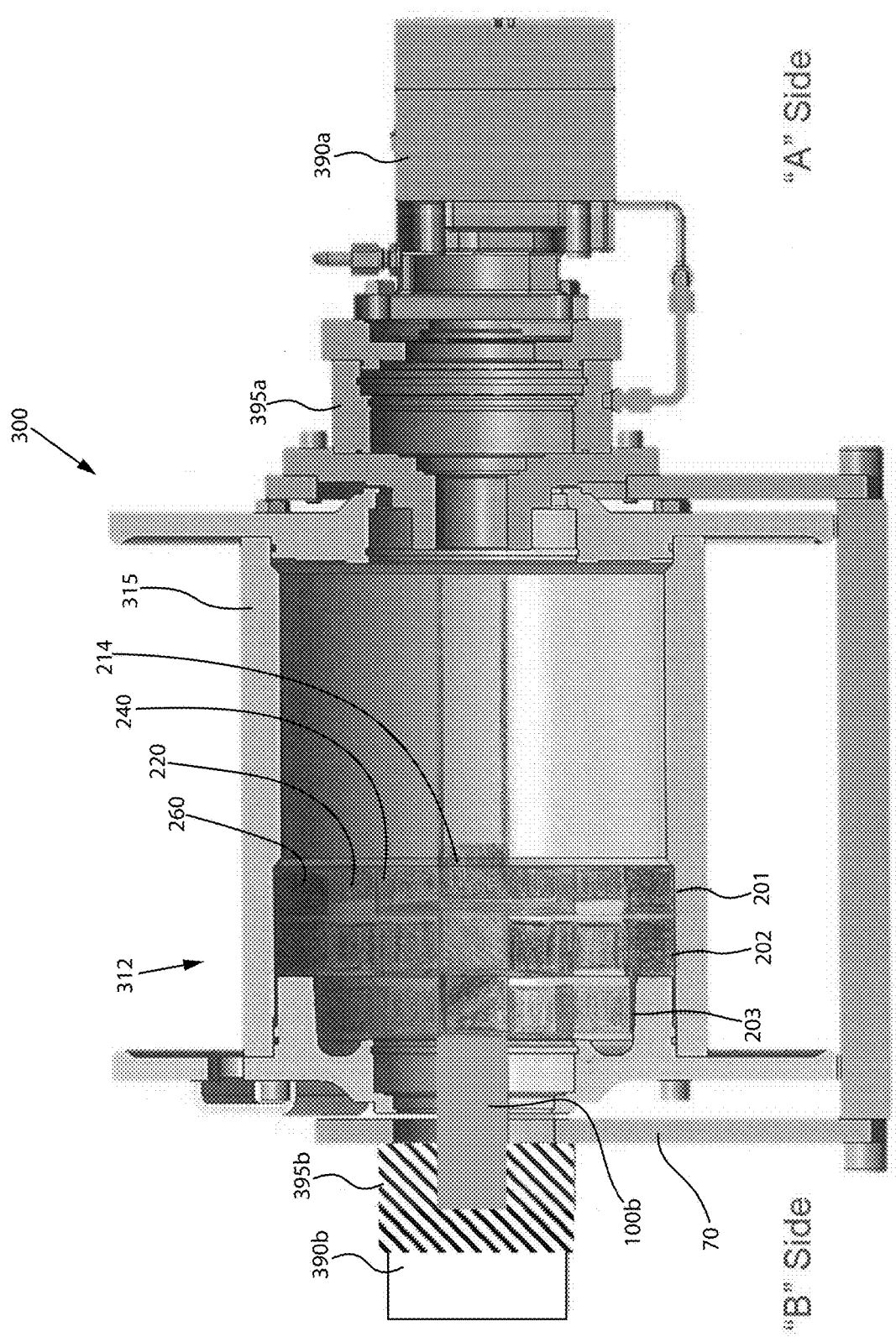
FIG. 4 is a side cut-away perspective view of an embodiment of a dual capacity winch having a mechanism for selectively fixing or freeing a planetary carrier of an epicyclic gearbox, wherein the mechanism has fixed the winch in a high or heavy load mode.

As depicted in FIG. 4, embodiments of a locking mechanism 100 may be placed in a locked position 100b, and used to selectively fix the planetary carrier shaft 240 of a last stage 203 of a gear assembly or gearbox 312 of a dual capacity winch 300. Hence, when the winch 300 is being used in high capacity heavy lifting utility mode, the planetary carrier shaft 240 is held fast in corresponding orientation with the winch upright 70 preventing planetary carrier 240 rotation relative to the drum 315, and transmitting the large load torque to the winch upright 70. Since the large load torque is directed to the winch upright, the brake 395a, on the low torque side "A" can be appropriately sized for lower loads. The torque transmission to the stationary winch upright 70, through the engagement of the locking mechanism 100 in a locked position 100b, helps facilitate efficient usage of a three-stage gear assembly or gearbox 312 and may result in an output torque through a gear reduction, for example of 64:1, while permitting maximum torque multiplication of the input created by motor 390a. In some winch 300 embodiments, a secondary brake, such as the action of a counterbalance valve, may be incorporated.

Figure 5:
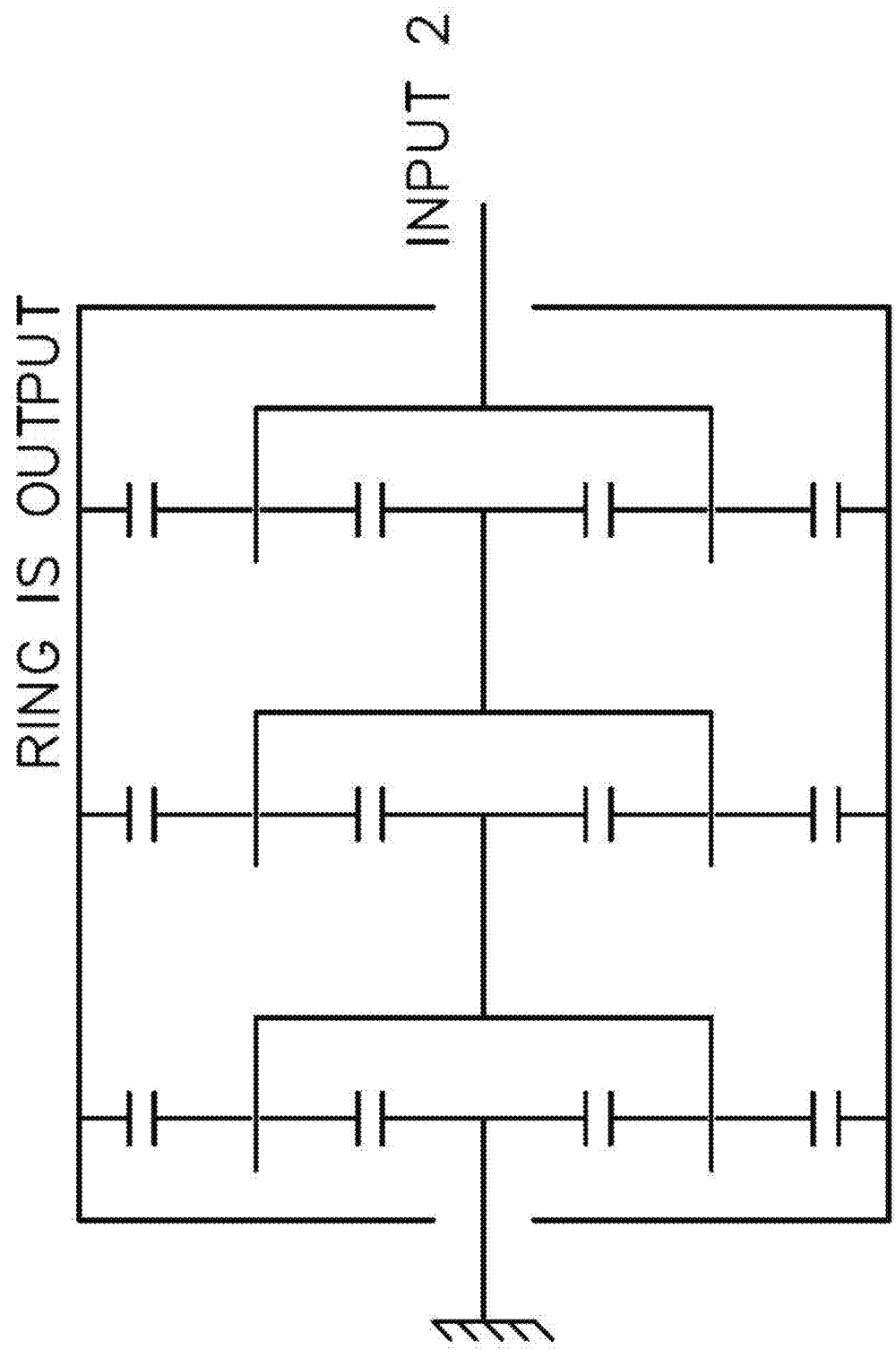
FIG. 5 is a schematic diagram of the operation of input torque upon the gearbox depicted in FIG. 4.

With common dual capacity winches, when selectively driving different members of an epicyclic (planetary) gear assembly or gearbox 312, the member that is fixed must be able to hold torque equal to the torque applied to the output member plus the input member. That is, if the ring gear is the output member and the sun gear is the input, the planet carrier is fixed and must hold load equal to the torque on the ring plus the torque on the sun gear. For an ordinary dual capacity winch, that would mean that the brake nearest the motor used to lift the lowest load, such as brake 395b, would have to hold the highest torque. Such a brake would be very large, especially in comparison to the motor required to lift the low load. However, the incorporation of a locking mechanism 100, which engages or disengages depending on the desired winch 300 operating mode, alleviates the need for such a large brake. If the user selects heavy load mode, the locking mechanism 100 will hold the planetary carrier 240 fast to the winch upright 70, preventing its rotation relative to the drum 315, and taking all of the reaction torque required. This is shown schematically in FIG. 5, which depicts the operation of input torque upon the gear assembly depicted in FIG. 4.

Figure 6:
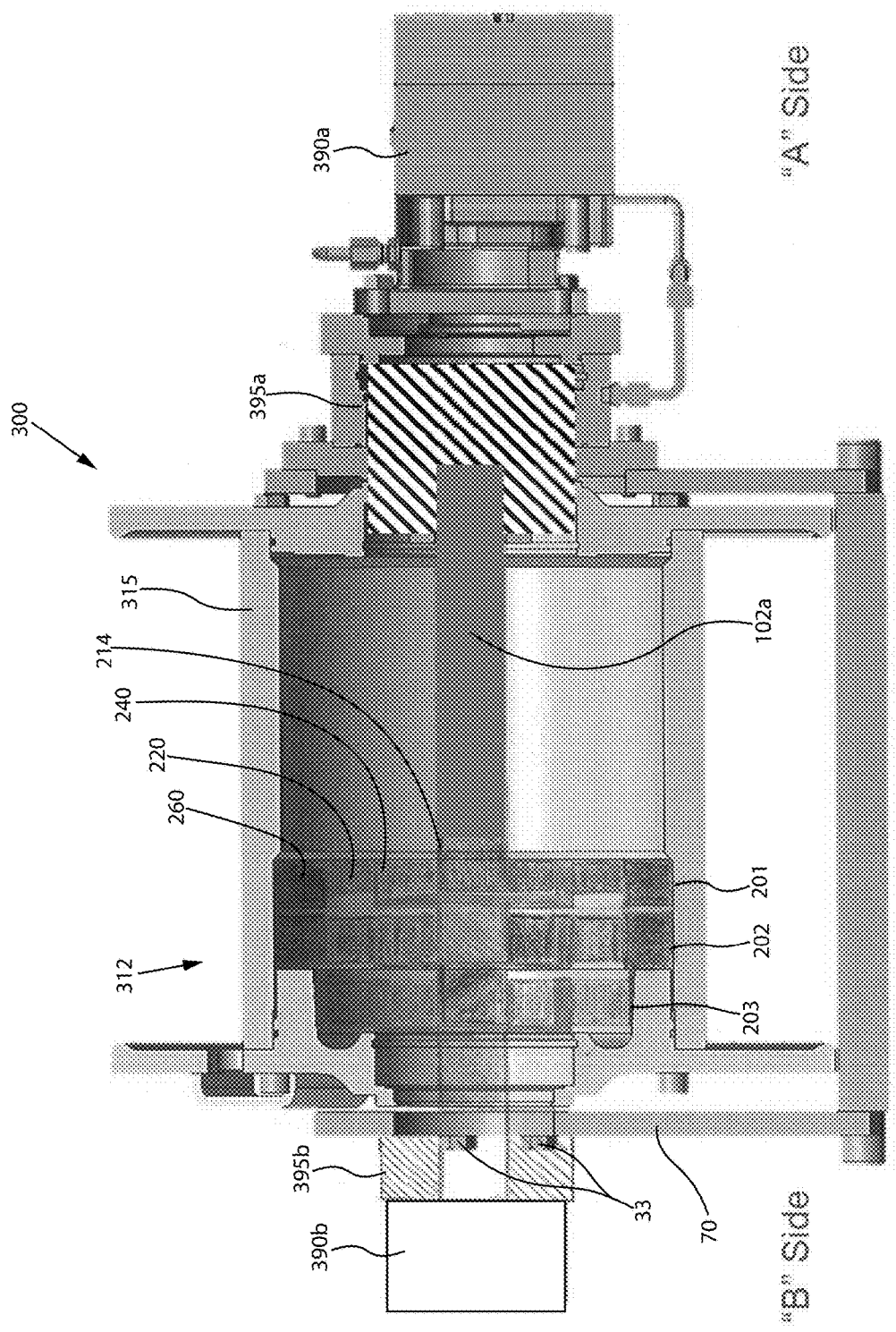
FIG. 6 is a side cut-away perspective view of an embodiment of a dual capacity winch having a mechanism for selectively fixing or freeing a planetary carrier of an epicyclic gearbox, wherein the mechanism has fixed the winch in a low or light load mode.
Figure 7:
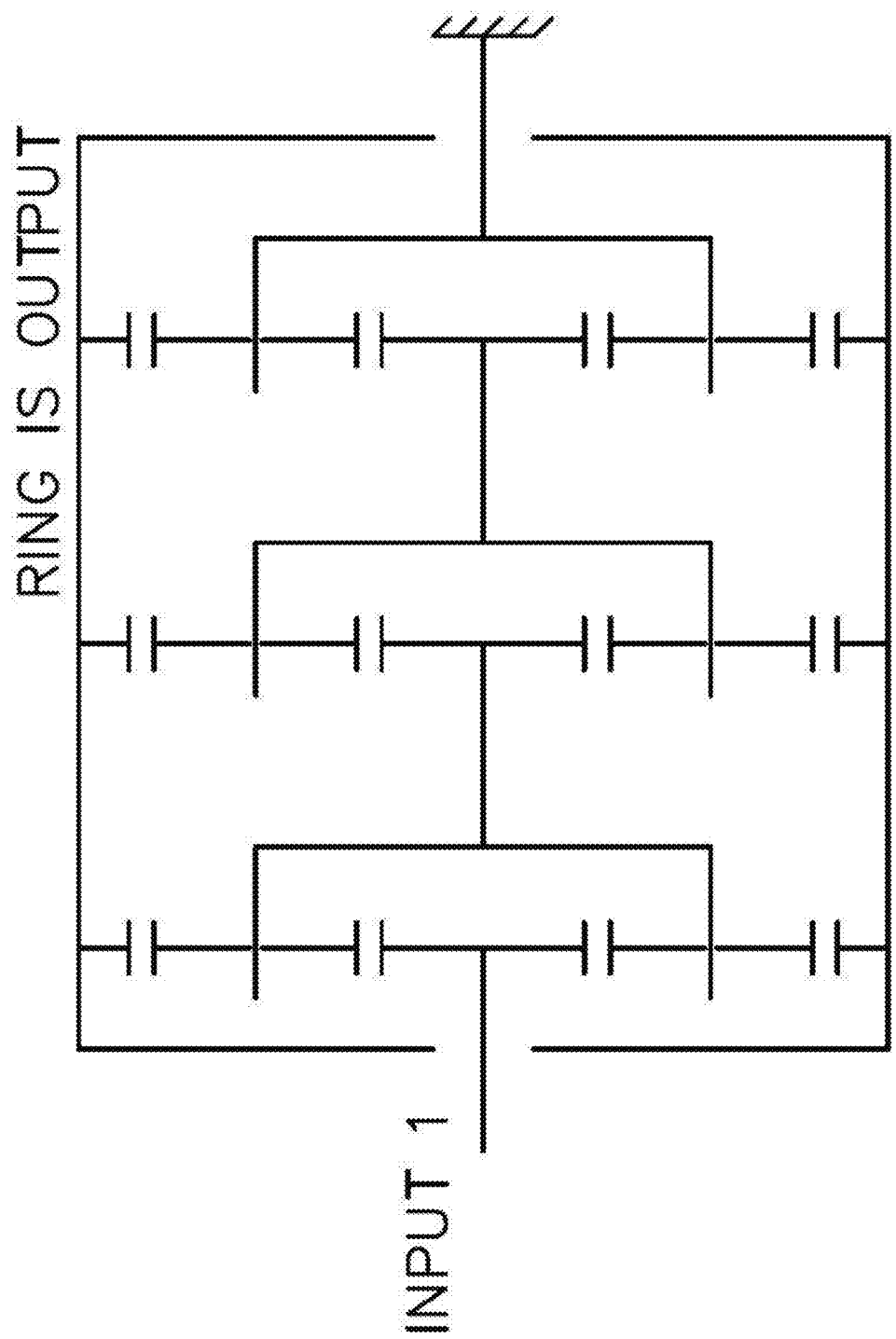
FIG. 7 is a schematic diagram of the operation of input torque upon the gearbox depicted in FIG. 6.

As depicted in FIG. 6, embodiments of a locking mechanism 100 may be placed in an unlocked position and used to selectively disengage the planetary carrier shaft 240 of a last stage 203 of a gearbox 312 of a dual capacity winch 300. Hence, when the winch 300 is being used in low capacity light load, such as personnel, lifting mode, the locking mechanism 100 will free the planetary carrier 240 from the winch upright 70, allowing a secondary motor 390b to turn the planetary carrier and lift the lighter load. In low load or light lifting mode, the brake 395a will hold one input, such as drum shaft 102a, in place while the motor 390b, on the opposite side of the gearbox 312 is powered. The low load motor 390b is connected to the disengaged and able to spin splined shaft 10 of locking mechanism 100, and the splined shaft 10 is, in turn connected to the last stage 203 planetary carrier 240 of the gearbox 312, thereby enabling the motor to turn the drum 315 connected to the gearbox 312. The splined shaft 10, therefore is part of the locking mechanism 100, while also serving as a drive component coupled to the low load motor 390b. Hence, during low load operation, the locking mechanism 100 on the low load side "B" is opened, and the motor 390b turns the drive shaft 10 that is directly coupled to the planet carrier 240 of the last stage 203 of the gearbox 312. The sun gear 214 of the first stage 201 is fixed, such as by the engagement of drum 395a upon the drum shaft 102a connected to sun gear 214. The other gears and carriers of the gearbox 312 rotate at various speeds, but the net result is that the ring gear 260 (directly coupled to the drum 315) rotates at a lower gear reduction, which provides a lower output torque. This lower output torque may be lower than the output torque produced by the use of the motor 390a, as described herein. For example, in this particular low load light lifting mode, the gear reduction may be very close to 1:1, with the drum 315 turning just slightly faster than the output rpm of motor 390b. This is shown schematically in FIG. 7, which depicts the operation of input torque upon the gear assembly or gearbox 312 depicted in FIG. 6.

In addition to automatically setting the lock state of the locking mechanism 100 to match the load mode, it may be possible to have an interlock on the locking mechanism 100 to prevent winch movement if the mechanism is not fully engaged/disengaged, or if it is in the wrong state. One way of accomplishing this may be to install plunger-style normally-open limit switches at each end of the linear actuator 50 travel. Thus, when the linear actuator 50 is fully extended, one limit switch would be closed and heavy load mode controls would be enabled. In addition, when the linear actuator 50 is fully retracted, the other limit switch would be closed and light load mode controls would be enabled.

The materials of construction of the winch 300 and its various component parts and/or including the locking mechanism 100 and its various component parts, may be formed of any of many different types of materials or combinations thereof that can readily be formed into shaped objects provided that the components selected are consistent with the intended operation of winches of the type disclosed herein. For example, a multistage epicyclic gearbox, similar to gear assembly or gearbox 312, was printed out of plastic. The plastic gearbox, similar to gearbox 312, was selectively driven through different members of the gearbox to confirm that turning the [first stage] sun gear while restraining the [last stage] planetary carrier resulted in the largest torque multiplication through the gearbox. The testing of this plastic embodiment confirmed that turning the [last stage] planetary carrier while fixing the [first stage] sun gear resulted in a lower torque multiplication. Those of ordinary skill in the art would appreciated that the construction and composition of components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining the above-described winch 10 and its various component parts may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, 3-D printing, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the present disclosure, as required by the following claims. The claims provide the scope of the coverage of the present disclosure and should not be limited to the specific examples provided herein.

What is claimed is:

1. A method for selectively fixing or freeing a planetary carrier of an epicyclic gearbox of a dual capacity winch, the method comprising:
   providing a dual capacity winch having a single epicyclic gearbox coupled to a drum of the winch, wherein the drum of the winch is supported by at least one stationary winch upright;
   providing a first motor configured to drive a sun gear of the epicyclic gearbox so that the operation of the gear box, when the sun gear is driven, results in substantial torque multiplication;
   providing a second motor configured to drive a planetary carrier of the epicyclic gearbox, so that the resulting gear ratio is significantly lower than when the sun gear is driven;
   providing a brake to selectively prevent movement of the sun gear; and
   providing a locking mechanism configured to engage and drive the planetary carrier of the epicyclic gearbox, wherein the locking mechanism includes a movable portion configured to:
   selectively engage and lock with a shaft fixedly coupled with the planetary carrier while remaining locked against rotation by fasteners connected to at least one stationary winch upright, when the sun gear is driven; and
   to selectively disengage and unlock from the shaft fixedly coupled with the planetary carrier, when the planetary carrier of the epicyclic gearbox is driven.

2. The method of claim 1, wherein the epicyclic gearbox includes multiple stages.

3. The method of claim 1, wherein the movable portion of the locking mechanism is a threaded lock plate configured to be driven by a threaded coupler selectively moved by a linear actuator.

4. The method of claim 1, wherein driving the sun gear corresponds to a heavy lifting operation mode of the dual capacity winch, wherein the heavy lifting mode is selected when the locking mechanism is locked into orientation with the at least one winch upright.

5. The method of claim 4, wherein when the heavy lifting load is selected, a light lifting mode is automatically prevented from becoming operable, so that the first and second motors cannot act on the gearbox at the same time.

6. The method of claim 1, wherein driving the planetary carrier corresponds to a light lifting operation mode of the dual capacity winch, wherein the light lifting load is selected when a shaft of the locking mechanism is free to rotate and is not locked into orientation with the at least one winch upright.

7. The method of claim 6, wherein when the light lifting load is selected, a heavy lifting mode is automatically prevented from becoming operable, so that the first and second motors cannot act on the gearbox at the same time.

8. A method of selectively driving different stages of an epicyclic gearbox of a dual capacity winch having high load and low load operation modes, the method comprising:
   selecting a high load operation mode of a dual capacity winch and utilizing a first motor
   to drive a gear of an epicyclic gearbox to turn a drum of the winch, wherein a locking mechanism is coupled to a planetary carrier of the epicyclic gearbox and is selectively engaged by axial positioning of a movable locking plate which is axially slidably connected with a winch upright of the winch, thereby preventing rotational movement of the planetary carrier, when then high load operation mode is selected;
   selecting a low load operation mode of the dual capacity winch and utilizing a second motor to drive the planetary carrier of the epicyclic gearbox to turn the drum of the winch with a much lower gear ratio than the high load operation, wherein the locking mechanism remains coupled to the planetary carrier but is selectively disengaged by axial positioning of the movable locking plate from the winch upright, thereby permitting rotational movement of the planetary carrier, when the low load operation mode is selected; and
   preventing rotational movement of the gear, when the low load operation mode is selected.

9. The method of claim 8, wherein the gear is a sun gear of a first stage of the epicyclic gearbox.

10. The method of claim 8, wherein the planetary carrier is configured to drive at least a last stage of the epicyclic gearbox.

11. The method of claim 8, wherein the selection of a mode automatically places the winch into a configuration that prevents another mode from becoming operable, so that the first and second motors cannot act on the gearbox at the same time.

12. The method of claim 8, wherein the gear ratio corresponding to the high load operation mode is approximately 64:1.

13. The method of claim 8, wherein the gear ratio corresponding to the low load operation mode is approximately 1:1.

14. The method of claim 8, wherein selective engagement or disengagement of the locking mechanism with the winch upright is effectuated by an actuator that moves a component of the locking mechanism into a configuration that either prevents or permits rotational movement of a shaft of the locking mechanism.

15. A locking mechanism to selectively fix or free a planetary carrier of an epicyclic gearbox, to selectively drive different stages of the epicyclic gearbox, the mechanism comprising:
   a shaft, configured to be driven by a first motor, wherein the shaft is coupled to a planetary carrier of an epicyclic gearbox, the shaft having engagement features;
   a locking component, having shaft engagement features configured to movably engage the engagement features of the shaft; and
   an actuator, the actuator configured to move the locking component between:
   a first position, wherein the shaft locking features of the locking component are in physical engagement with the locking features of the shaft shaft, so that the shaft is not free to spin and be driven by the first motor, but a gear of the epicyclic gearbox is free to be driven by a second motor; and a second position, wherein the shaft engagement features of the locking component are disengaged from the engagement features of the shaft, so that the shaft is free to spin and be driven by the first motor wherein in both the first and second positions, the locking component is locked against rotation by fasteners connected to at least one stationary winch upright.

16. The locking mechanism of claim 15, wherein the locking mechanism and epicyclic gearbox are components of a dual capacity winch.

17. The locking mechanism of claim 16, wherein the locking component is a locking plate having external threads configured to operate with internal threads of the threaded coupler, and the shaft engagement features of the locking component are radially internal splines, and the engagement features of the shaft are radially external splines.

18. The locking mechanism of claim 15, wherein the actuator moves a threaded coupler, which, in turn, moves the locking component.

19. The locking mechanism of claim 15, wherein the first position of the actuator corresponds to a high load heavy lifting mode of a dual capacity winch, and the second position of the actuator corresponds to a low load light lifting mode of the dual capacity winch.

20. The locking mechanism of claim 19, wherein when one lifting load of the dual capacity winch is selected, any other mode is automatically prevented from becoming operable, so that the first and second motors cannot act on the gearbox at the same time.

* * * * *